(12) United States Patent
Pozgay (10) Patent No.: US 7,015,857 B1
(45) Date of Patent: Mar. 21, 2006

(54) CALIBRATING AN ANTENNA BY DETERMINING POLARIZATION

(75) Inventor: Jerome H. Pozgay, Marblehead, MA (US)

(73) Assignee: Raytheon Company, Waltham, MA (US)

( * ) Notice: Subject to any disclaimer, the term of this patent is extended or adjusted under 35 U.S.C. 154(b) by 112 days.

(21) Appl. No.: 10/970,255

(22) Filed: Oct. 20, 2004

(51) Int. Cl.
*G01S 7/40* (2006.01)

(52) U.S. Cl. .......................... 342/174; 342/73; 342/74; 342/165; 342/173; 342/175; 342/188; 342/195; 342/360; 342/361; 343/703

(58) Field of Classification Search ............... 343/703, 343/720; 342/73–81, 165–175, 188–197, 342/359–384, 450–465, 352
See application file for complete search history.

(56) References Cited

U.S. PATENT DOCUMENTS

| | | | | |
|---|---|---|---|---|
| 5,068,668 A | * | 11/1991 | Tsuda et al. ................ | 342/362 |
| 5,477,229 A | * | 12/1995 | Caille et al. ................ | 342/360 |
| 5,546,090 A | * | 8/1996 | Roy et al. ................... | 342/174 |
| 5,559,519 A | | 9/1996 | Fenner ........................ | 342/174 |
| 5,973,638 A | * | 10/1999 | Robbins et al. ............. | 342/172 |
| 5,977,906 A | | 11/1999 | Ameen et al. ............... | 342/174 |
| 6,002,364 A | | 12/1999 | Kroeger et al. ............. | 342/359 |
| 6,157,343 A | * | 12/2000 | Andersson et al. ......... | 342/371 |
| 6,208,287 B1 | * | 3/2001 | Sikina et al. ................ | 342/174 |
| 6,236,363 B1 | * | 5/2001 | Robbins et al. ............. | 342/360 |
| 6,252,542 B1 | * | 6/2001 | Sikina et al. ................ | 342/174 |
| 6,339,399 B1 | * | 1/2002 | Andersson et al. ......... | 342/372 |
| 6,480,153 B1 | | 11/2002 | Jung et al. .................. | 342/368 |
| 6,690,917 B1 | * | 2/2004 | Soliman et al. ............. | 342/352 |
| 6,806,837 B1 | * | 10/2004 | Saucier et al. .............. | 342/169 |

OTHER PUBLICATIONS

Patent Application entitled *"Estimating An Antenna Pointing Error By Determining Polarization"*, 34 pages, specification, claims, and abstract, 2 pages of drawings, inventor Jerome H. Pozgay, Oct. 20, 2004.

Patent Application entitled *"Estimating An Angle-Of-Arrival Of A Signal By Determining Polarization"*, 34 pages, specification, claims, and abstract, 2 pages of drawings, inventor Jerome H. Pozgay, Oct. 20, 2004.

* cited by examiner

*Primary Examiner*—Bernarr E. Gregory
(74) *Attorney, Agent, or Firm*—Baker Botts L.L.P.

(57) ABSTRACT

Calibrating an antenna includes receiving a signal sent from a reference located within a region. The signal has a polarization within an expected polarization range. Polarization value sets are established in accordance with the expected polarization range. Polarization ratios are generated from the plurality of polarization value sets. A minimum polarization ratio variance for the plurality of polarization ratios is established. A polarization value set corresponding to the minimum polarization ratio variance is identified. A calibration correction is determined in accordance with the identified polarization value set.

20 Claims, 2 Drawing Sheets

CALIBRATING AN ANTENNA BY DETERMINING POLARIZATION

GOVERNMENT FUNDING

The U.S. Government may have certain rights in this invention as provided for by the terms of Grant No. N00039-02-C-3296/MUOS Component Advanced Development awarded by the United States Navy.

TECHNICAL FIELD

This invention relates generally to the field of antenna systems and more specifically to calibrating an antenna by determining signal polarization.

BACKGROUND

An antenna may receive a signal that may be regarded as a plane wave. The polarization of the plane wave may need to be determined in order to perform certain calculations such as estimating the angle of arrival of the signal. According to known techniques of determining polarization, mutually orthogonal polarizations are simultaneously measured. The known techniques, however, are not efficient or cost-effective in certain situations. It is typically desirable to determine polarization in an efficient and cost-effective manner.

SUMMARY OF THE DISCLOSURE

In accordance with the present invention, disadvantages and problems associated with previous techniques for calibrating a singly polarized antenna system may be reduced or eliminated.

Calibrating an antenna includes receiving a signal sent from a reference located within a region. The signal has a polarization within an expected polarization range. Polarization value sets are established in accordance with the expected polarization range. Polarization ratios are generated from the plurality of polarization value sets. A minimum polarization ratio variance for the plurality of polarization ratios is established. A polarization value set corresponding to the minimum polarization ratio variance is identified. A calibration correction is determined in accordance with the identified polarization value set.

Certain embodiments of the invention may provide one or more technical advantages. A technical advantage of one embodiment may be that the polarization of an incident wave is determined from the responses of a singly polarized antenna. Another technical advantage of one embodiment may be that an antenna may be calibrated using the determined polarization.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
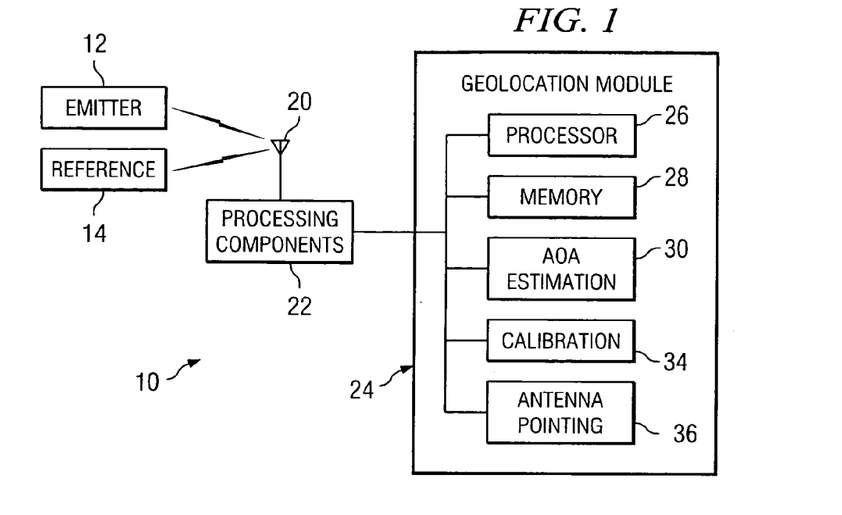
FIG. 1 is a block diagram of one embodiment of a system that receives signals from an emitter and a reference.

FIG. 1 is a block diagram of one embodiment of a system 10 that receives signals from an emitter 12 and a geographic reference 14. System 10 may use reference 14 to provide one or more operations to generate geolocation information about emitter 12. As an example, system 10 may determine an antenna pointing error of an antenna that receives a signal from reference 14. As another example, system 10 may calibrate the antenna using a signal from reference 14. As yet another example, system 10 may estimate the angle of arrival of a signal received from emitter 12. To provide these features, system 10 estimates the polarization of incoming signals from data collected during geolocation processes. System 10 may estimate the polarization even when only one polarization sense is available.

According to the illustrated embodiment, emitter 12 may comprise any suitable communication device having an antenna that emits a signal. An antenna may refer to a device operable to transmit, receive, or both transmit and receive signals. The antenna may comprise, for example, an electrically small antenna of less than twenty wavelengths. A signal may refer to an electrical quantity, such as a current or voltage, that may be used to convey information. The signal may have any suitable frequency, such as a ultra high frequency (UHF). Emitter 12 may be any suitable distance from system 10, for example, approximately 20,000 miles away. The precise location of emitter 12 may not be known, but emitter 12 may be localized within a receive beamwidth. For example, emitter 12 may be localized within a receive beamwidth of approximately four degrees.

Geographic reference 14 may comprise any suitable communication device that has an antenna and a known location. The location may be expressed in any suitable manner, for example, as a spatial or angular region in which reference is located with respect to standard earth coordinates. Reference 14 may comprise, for example, a ground station for a communication system. Ground stations are typically equipped with moderately high gain antennas and moderately high power sources. As an example, the axial ratio of the antennas may be at least 1.5 decibels, and the effective isotropic radiative power may be at least fourteen decibel watts. Reference 14 may provide a continuous wave tone at any suitable frequency lasting for a period of, for example, approximately one second.

According to the embodiment, a signal from emitter 12 or reference 14 may be assumed to have the properties of a uniform transverse electromagnetic (TEM) plane wave when received by system 10. The time-varying electric and magnetic fields of a uniform TEM plane wave are orthogonal to the direction of propagation, and instantaneously neither field has spatial variation in planes perpendicular to the direction of propagation. Moreover, a uniform plane wave may be decomposed into two waves having the same direction of propagation but with mutually perpendicular electric and magnetic fields.

The electric field E(x,t) of a uniform plane wave for position vector x at time t may be represented by Equation (1):

$$E(x, t) = \frac{1}{\sqrt{2\pi}} P e^{j(k \cdot x - \omega t)} E_o \qquad (1)$$

where k is the propagation wave number, $E_o$ is the complex magnitude of the incident wave electric field, and P is the polarization vector relating the field components.

Position vector x and propagation wave number k may be defined by Equations (2) and (3):

$$x = x\hat{x} + y\hat{y} + z\hat{z} \qquad (2)$$

$$k = k_x \hat{x} + k_y \hat{y} + k_z \hat{z} = \\ -|k|(\sin\theta \cos\phi \hat{x} + \sin\theta \sin\phi \hat{y} + \cos\theta \hat{z})$$

where $\hat{x}$ is a unit vector in the coordinate system. Polarization vector P represents the polarization of the wave, and may be expressed by Equation (4):

$$P = P_x \hat{x} + P_y \hat{y} + P_z \hat{z} \qquad (4)$$

Propagation wave number k represents a wave propagating toward the antenna, where |P|=1 and k·P=0. Typically, the maximum projection of the z-component $P_z$ is much less than x-component $P_x$ and y-component $P_y$ over the visible surface of the earth, so the z-component $P_z$ may be assumed to be zero.

System 10 may comprise an antenna system 20, signal processing components 22, and geolocation modules 26 coupled as illustrated. Antenna system 20 may comprise one or more suitable antennas operable to transmit, receive, or both transmit and receive signals. For example, antenna system 20 may comprise communications antennas located on non-uniformly spaced communications satellites traveling in an equatorial geosynchronous orbit.

An antenna may comprise a reflector and a feed, for example, an off-set fed parabolic reflector and a focal region feed. The parabolic reflector may have any suitable diameter, for example, from 10 to 20 wavelengths, such as approximately 16 wavelengths. The focal region feed may comprise one or more radiators arranged in any suitable configuration. A radiator may be right-hand or left-hand circularly polarized. As an example, the focal region feed may comprise radiators of one polarization sense arrayed on an isosceles grid centered on the focal point of the reflector. Right-hand circularly polarized (RHCP), left-hand circularly polarized (LHCP) radiators, or any combination of the preceding may be used.

Typically, an off-set fed parabolic reflector, along with the feed, contribute to the polarization response to the incident plane wave. More particularly, the receive pattern pointing direction and shape are strongly dependent on the shape of the reflector and the polarization of the plane wave. Accordingly, the polarization of the incident plane wave may need to be determined to perform certain geolocation operations.

Processing components 22 process signals received from the antennas. According to one embodiment, each radiator may be followed by processing components 22 such as a filter, a low noise amplifier, a mixer, an analog-to-digital converter, other suitable component, or any combination of the preceding.

According to the illustrated embodiment, geolocation module 26 includes a processor 26, memory 28, and one or more modules 30, 34, and 36 coupled as illustrated. Processor 26 manages the operation of geolocation module 26, and may comprise any suitable hardware, software, or combination of hardware and software. As used in this document, the term "processor" refers to any suitable device operable to execute instructions and manipulate data to perform operations.

Memory 28 stores and facilitates retrieval of information used by processor 26, and may include random access memory (RAM), read only memory (ROM), magnetic drives, disk drives, compact disk (CD) drives, digital video disk (DVD) drives, removable media storage, any other suitable data storage device, or a combination of any of the preceding.

Geolocation module 26 include modules that provide geolocation operations. According to the illustrated embodiment, geolocation modules 26 includes an angle-of-arrival (AOA) estimation module 30, a calibration module 34, and an antenna pointing module 36.

Angle-of-arrival estimation module 30 estimates the angle-of-arrival of an incident plane wave received from emitter 12. The angle-of-arrival may refer to the angle of incidence of a signal arriving at an antenna with respect to the pointing direction of the antenna. According to one embodiment, the plane wave is arbitrarily polarized. AOA estimation module 30 determines the polarization of the incident plane wave to estimate the angle-of-arrival. AOA estimation module 30 may estimate the angle-of-arrival using any suitable method, such as the method described with reference to FIG. 2.

Calibration module 34 calibrates the antenna using an incident plane wave received from reference 14. Calibration of an antenna refers to determining corrections to the complex transfer function coefficients of the antenna. Calibration module 34 determines the polarization of the incident plane wave to calibrate the antenna system. Calibration module 34 may calibrate the antenna using any suitable method, such as the method described with reference to FIG. 3.

Antenna pointing module 36 estimates the antenna pointing error of the antenna boresight of the antenna using an incident plane wave received from reference 14. Antenna pointing module 36 determines the polarization of the incident plane wave to estimate the antenna pointing error. Antenna pointing module 36 may estimate the antenna pointing error using any suitable method, such as the method described with reference to FIG. 4.

Modifications, additions, or omissions may be made to system 10 without departing from the scope of the invention. The components of system 10 may be integrated or separated according to particular needs. For example, any of the components may be located in the same device or may be located in different devices that communicate via wireless or other type of link. Moreover, the operations of system 10 may be performed by more, fewer, or other modules. For example, the operations of AOA module 30 and calibration module 34 may be performed by one module, or the operations of AOA module 30 may be performed by more than one module. Additionally, operations of system 10 may be performed using any suitable logic comprising software, hardware, other logic, or any suitable combination of the preceding. As used in this document, "each" refers to each member of a set or each member of a subset of a set.

Figure 2:
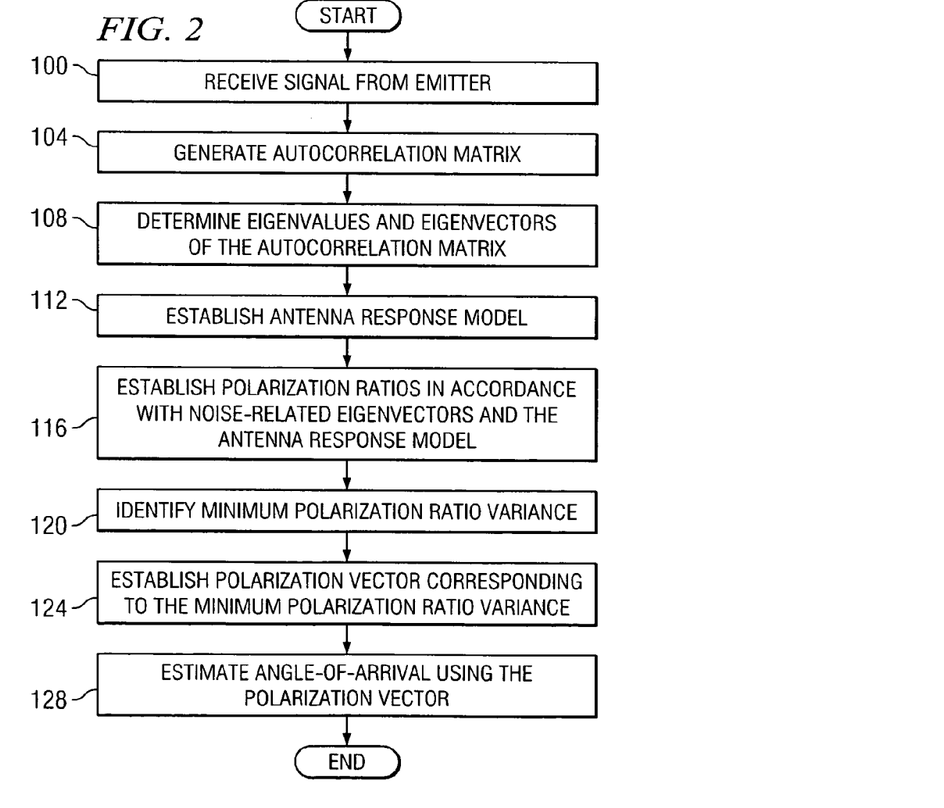
FIG. 2 is a flowchart of one embodiment of a method for estimating the angle-of-arrival for an incident plane wave arriving at the system of FIG. 1 from an emitter.

FIG. 2 is a flowchart of one embodiment of a method for estimating the angle-of-arrival of an incident plane wave from emitter 12. The method investigates the variance of polarization ratios associated with a dominant eigenvector. The dominant eigenvector provides a representation of the antenna state for the polarization of an incident wave. The polarization value set corresponding to the minimum polarization ratio variance is selected as the optimal polarization value set, which is used to determine the angle-of-arrival.

According to the embodiment, the complex amplitude errors and antenna pointing errors of system 10 are known, and the antenna is calibrated. The polarization of incident plane wave from emitter 12 is unknown. The method begins at step 100, where system 10 receives a signal from emitter 12 arriving as a uniform plane wave. The output x of channel m of antenna system 20 at time sample nt may be represented by Equation (5)

$$X_{m,n_t} = s_{m,n_t} + \text{noise}_{m,n_t} \quad (5)$$

where $S_{m,n_t}$ is the signal sample for channel m at time sample $n_t$, and $\text{noise}_{m,n_t}$ is the corresponding noise for channel m at time sample $n_t$. A channel output may include a representation of receiver noise and the incident signal as spatially sampled by a feed and a reflector.

An autocorrelation matrix is generated at step 104. An autocorrelation matrix may refer to a measure of the similarity of the time-varying signals received by the various channels. For example, the channel outputs may be correlated to yield autocorrelation matrix R as described by Equation (6):

$$R = x \cdot x \dagger \quad (6)$$

where the superscript † indicates the conjugate transpose operation. Matrix R may be formed and decomposed to provide a channel frequency band and an approximate vicinity of emitter 12 with respect to the antenna boresight.

Eigenvalues and eigenvectors of the autocorrelation matrix are determined at step 108. The eigenvectors represent signal measurements that include noise. The eigenvector associated with the dominant eigenvalue provides a noisy representation of the antenna state for a particular angle of incidence and polarization of the incident wave. If the signal-to-noise ratio is large in each channel of interest, the elements of the dominant eigenvector represent the complex amplitude of the incident wave as filtered by the wave polarization, the gain of each constituent beam at the incident angle, and the relative errors of system 10.

An antenna response model is established at step 112. An antenna response model refers to a model that represents the response of an antenna to an incident signal. An antenna response model may be expressed as a vector $\Re(u_{zero}, v_{zero})$ with elements representing the antenna response for each channel at a spatial point $(u_{zero}, v_{zero})$. A plane wave can be represented as the superposition of the two orthogonally polarized plane waves, so response model vector $\Re(u_{zero}, v_{zero})$ may be expanded as the superposition of responses to a pair of plane waves. According to one embodiment, the radiators have one sense of circular polarization, so linearly polarized plane waves may be used as the pair of plane waves. As an example, the pair of plane waves may have electric fields parallel to the xz-plane and to the yz-plane in the antenna system. Accordingly, the antenna response model may be represented by Equation (7):

$$\Re(u_{zero}, v_{zero}) = p_x \cdot \Re_x(u_{zero}, v_{zero}) + p_y \cdot \Re_y(u_{zero}, v_{zero}) \quad (7)$$

where polarization values $p_x$ and $p_y$ are complex scalar components of the polarization vector that represents the polarization of the plane waves.

Steps 116 through 124 describe determining the polarization of the incident plane wave. Polarization ratios are established in accordance with the noise-related eigenvectors and the antenna response model at step 116. The polarization vector includes polarization values comprising complex scalar components $p_x$ and $p_y$. A polarization ratio may refer to a ratio of one complex scalar component of the polarization vector to the other complex scalar component of the polarization vector. The y-form polarization ratio $p_x/p_y$ assumes that the incident plane wave has a y-component, and the x-form polarization ratio $p_y/p_x$ assumes that the incident plane wave has an x-component.

Noise-related eigenvectors are orthogonal to the receive beam pattern in the direction of the incident plane wave, so the projection of the noise-related eigenvectors onto the antenna response model yields a zero value in the direction of the incident plane wave and non-zero values elsewhere. The projection approximating zero may be expressed by Equation (8):

$$0 \approx \xi^{m\dagger} \cdot \Re(u_{zero}, v_{zero}) \quad (8)$$

where $\xi^{n\dagger}$ is the conjugate transpose of the eigenvector associated with the $n^{th}$ eigenvalue. Antenna response model vector $\Re(u_{zero}, v_{zero})$ may be expanded according to Equation (7) to yield Equation (9):

$$0 \approx \xi^{m\dagger}[p_x \cdot \Re_x(u_{zero}, v_{zero}) + p_y \cdot \Re_y(u_{zero}, v_{zero})] \quad (9)$$

Equation (9) may be solved for the polarization ratios.

The minimum polarization ratio variance over the vicinity of emitter 12 is identified at step 120. Polarization ratio variance may refer to the variance of polarization ratios over a region. The vicinity of emitter 12 may be expressed as in any suitable manner, such as by a spatial or angular region with respect to antenna system 20. The eigenvectors describe the polarization state of the incident plane wave, which is independent of which eigenvector under consideration. Accordingly, except for the noise, the polarization ratio is the same for the projection of any eigenvector onto the antenna model when evaluated in the direction of incidence. That is, the polarization ratio variance over the set of noise-related eigenvectors is minimized in the direction of incidence.

According to one embodiment, a polarization ratio map may be prepared from the noise-related eigenvectors in order to determine the minimum values of polarization ratio variance. A polarization ratio map refers to a map that describes the polarization ratios over a region. A polarization ratios may be mapped over a search region for emitter 12 to generate a map. A peak of the map may be selected as a minimum polarization ratio variance value. The process may be performed using the x-form, the y-form, or both the x-form and y-form polarization ratio variances. X-form and the y-form maps may be prepared in any suitable order or may be prepared simultaneously.

A peak may be selected from multiple peaks of a map using quality criteria. According to one embodiment, the quality of a peak may be evaluated using the slope of the peak. For example, a peak may be required to have a slope that exceeds a threshold value. As another example, the peak with the greatest slope may be selected. According to one embodiment, if no suitable peaks are found, the estimate of polarization may be arbitrarily set to right-hand circular.

A polarization vector associated with the minimum polarization ratio variance value is established at step 124. The maps may yield multiple peaks, each of which may be used to generate a polarization vector. An optimum polarization vector may be selected from the multiple polarization vectors according to any suitable technique. According to one embodiment, an optimum polarization vector may be selected by evaluating the peaks. As an example, the polarization estimate may be selected based on the nearness of multiple solutions, the largest polarization variance matrix value, and the magnitude of the difference between the maxima.

The angle of arrival is estimated using the polarization vector at step 128. A source polarization-corrected map is generated from the polarization vector. Peaks of the source polarization-corrected map are established to estimate the angle of arrival. If these are multiple peaks, a peak analysis may be used to select a peak. The selected peak is analyzed and fitted with a third order polynomial. The polynomial fit is searched for −10 decibel points relative to the peak, and the angle of arrival is estimated as a mean angle between the −10 decibel points for each cardinal plane. After estimating the angle of arrival, the method terminates.

Modifications, additions, or omissions may be made to the method without departing from the scope of the invention. The method may include more, fewer, or other steps. Additionally, steps may be performed in any suitable order without departing from the scope of the invention.

Figure 3:
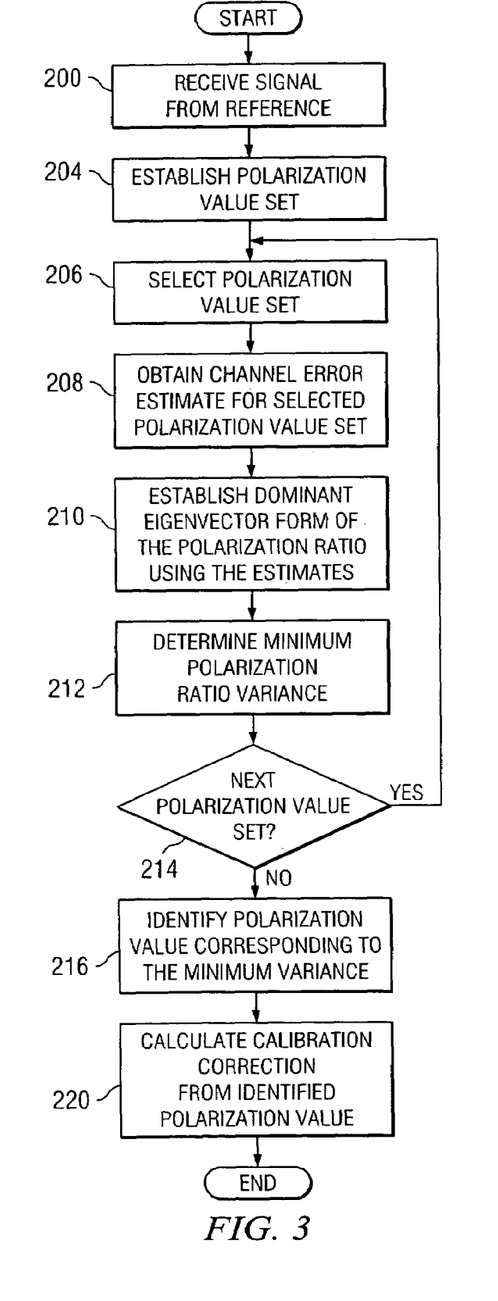
FIG. 3 is a flowchart of one embodiment of a method for calibrating an antenna of the system of FIG. 1 using a reference.

FIG. 3 is a flowchart of one embodiment of a method for calibrating an antenna of system 10 of FIG. 1 using reference 14. The method investigates the variance of the dominant eigenvector form of the polarization ratios. The dominant eigenvector provides a representation of the antenna state for the polarization of an incident wave. The polarization value set corresponding to the minimum polarization ratio variance is selected as the optimal polarization value set, which is used to calculate a calibration correction.

According to the embodiment, the approximate location of geographic reference 14, the expected polarization range of the incident wave, and the antenna pointing error of antenna system 20 are known. The antenna pointing error may be determined using any suitable technique, for example the method described with reference to FIG. 4. The method begins at step 200, where system 10 receives a signal from reference 14 as an incident plane wave.

Steps 206 through 214 describe searching the approximate location of reference 14 to estimate the polarization of incident plane wave from reference 14. Polarization values are established from the expected polarization range at step 204. A polarization value refers to a complex scalar component $p_i$, $i=x,y,z$, of the polarization vector. The polarization values may be determined in accordance with the specifications of the ground equipment.

A polarization value set is selected at step 206. A polarization value set may refer to any suitable combination of polarization values. If the z-component is ignored, a polarization value set may comprise $p_x$ and $p_y$. Channel error estimates are obtained for the selected polarization value set at step 208. A relative channel error estimate may be obtained for each channel using the ratio of the coefficients $\alpha_n$ of the antenna model over the coefficients $\alpha_{ref}$ of reference 14, which may be given by Equation (9):

$$\frac{\alpha_n}{\alpha_{ref}} = \frac{p_x \cdot \mathfrak{R}_x^n(u_{CoopEm}, v_{CoopEm}) + p_y \cdot \mathfrak{R}_x^{ref}(u_{CoopEm}, v_{CoopEm})}{p_x \cdot \mathfrak{R}_x^{ref}(u_{CoopEm}, v_{CoopEm}) + p_y \cdot \mathfrak{R}_y^{ref}(u_{CoopEm}, v_{CoopEm})} \div \frac{\zeta_{ref}}{\zeta_n} \quad (9)$$

where index CoopEm identifies the measured location of reference 14.

Steps 210 and 214 describe determining a minimum polarization ratio variance, and may be performed in substantially the same manner as steps 104 through 124 of the flowchart of FIG. 2. The dominant eigenvector form of the polarization ratio is established using the channel error estimates at step 210. The dominant eigenvector form of the polarization ratio may refer to the ratio of the dominant eigenvector component $\xi_n$ of each channel n relative to the response described by vector $\mathfrak{R}(u_{zero}, v_{zero})$ which may be given by Equation (10):

$$\rho_n = \frac{\zeta_n \div \alpha_n}{p_x \cdot \mathfrak{R}_x^n(u, v) + p_y \cdot \mathfrak{R}_y^n(u, v)} \quad (10)$$

If there is a next polarization value set at step 212, the method returns to step 206 to select the next polarization value set. If there is no next polarization value set at step 212, the method proceeds to step 214.

The minimum polarization ratio variance over the approximate location of reference 14 is determined at step 214. A polarization ratio map may be used to determine the minimum variance. The polarization value set corresponding to the minimum polarization ratio variance is identified at step 216. The calibration correction for receiver error is calculated from the identified polarization value set at step 220. The elements of the dominant eigenvector normalized to the vector component corresponding to reference 14 may be used to obtain an estimate of the channel coefficient using Equation (9). After calculating the calibration correction, the method terminates.

Modifications, additions, or omissions may be made to the method without departing from the scope of the invention. The method may include more, fewer, or other steps. Additionally, steps may be performed in any suitable order without departing from the scope of the invention.

Figure 4:
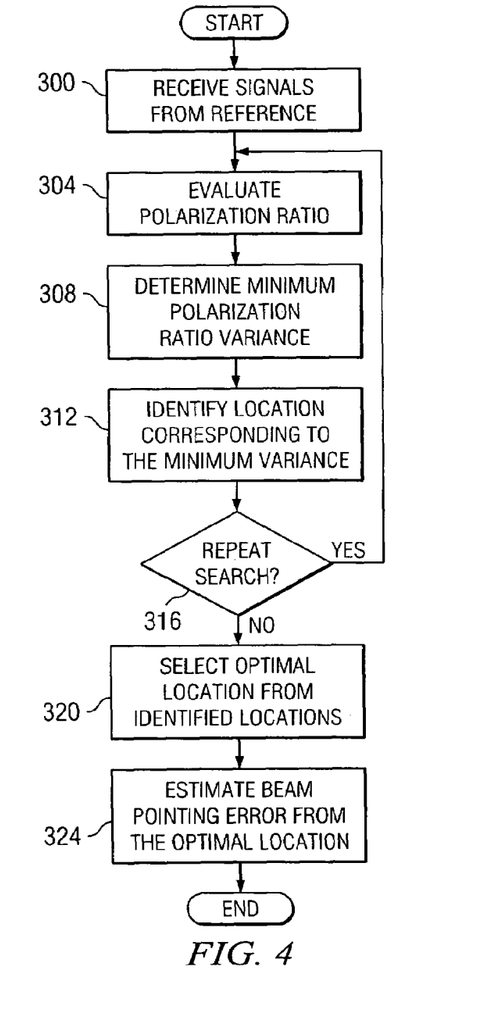
FIG. 4 is a flowchart of one embodiment of a method for determining the pointing error of the antenna of the system of FIG. 1 using a reference.

FIG. 4 is a flowchart of one embodiment of a method for determining the pointing error of an antenna of system 10 of FIG. 1 using reference 14. As discussed above, the dominant eigenvector provides a representation of the antenna state for the angle of incidence and polarization of an incident wave. The method investigates the variance of the dominant eigenvector form of the polarization ratios. The minimum variance corresponds to the location of reference 14 with respect to the antenna boresight.

According to the embodiment, reference 14 comprises a high-power emitter with an axial ratio of less than 1.5 decibels. The location of reference 14 is known. The incident plane wave from reference 14 is matched in polarization to the antenna, and the channel errors are bounded in amplitude and phase. The method begins at step 300, where system 10 receives a signal from reference 14 as a plane wave.

Steps 304 and 308 describe determining a minimum polarization ratio variance, and may be performed in substantially the same manner as steps 104 through 124 of the flowchart of FIG. 2. The dominant eigenvector form of the polarization ratio is evaluated across the approximate location of reference 14 at step 304. The ratio may comprise the ratio of the dominant eigenvector component $\xi_n$ of each channel n relative to the response to an incident plane as described by antenna response model vector $\Re(u, v)$. The ratio may be given by Equation (11):

$$\rho_n = \frac{\xi_n \div \alpha_n}{-\sqrt{2}\sqrt{-1} \cdot \Re_x^n(u, v) + \sqrt{2} \cdot \Re_y^n(u, v)} \quad (11)$$

The approximate location may be searched by first randomly varying the phase of the channel amplitude estimate a while holding the amplitude fixed. Then, the amplitude may be randomly varied while the phase is fixed. The approximation of the phase may be used as the fixed phase.

The minimum polarization ratio variance over channels is determined at step 308. A polarization ratio map may be used to determine the minimum variance. The location (u,v) corresponding to the minimum polarization ratio variance is identified at step 312. The identified location represents an estimate of the emitter location relative to the antenna boresight.

The search may be repeated at step 316. Since the complex amplitude characteristic coefficients are randomly selected, the search may be repeated any suitable number of times to improve the estimates. For example, the search may be repeated approximately 100 times. In general, the larger the error of the coefficients, the more iterations may be needed to achieve an optimal location. If the search is to be repeated, the method returns to step 304, to begin the next search. If the search is not to be repeated, the method proceeds to step 320.

The optimal location is selected from the locations identified during the search iterations at step 320. The optimal location may be determined by performing a mathematical operation on the identified locations. For example, the identified locations may be averaged to yield the optimal location. The antenna pointing error is estimated using the optimal location at step 324. After determining the antenna pointing error, the method terminates.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that the polarization of an incident wave is determined from responses of a singly polarized antenna. Another technical advantage of one embodiment may be that an antenna may be calibrated using the determined polarization.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for calibrating an antenna, comprising:
   receiving a signal sent from a reference, the signal detected by a singly polarized antenna system, the reference located within a region, the signal having a polarization within an expected polarization range;
   establishing a plurality of polarization value sets in accordance with the expected polarization range, a polarization value set comprising one or more polarization values, a polarization value comprising a complex scalar component of a polarization vector;
   generating a plurality of polarization ratios from the plurality of polarization value sets;
   establishing a minimum polarization ratio variance for the plurality of polarization ratios, the minimum polarization ratio variance describing a minimum variance of the polarization ratios over the region;
   identifying a polarization value set corresponding to the minimum polarization ratio variance; and
   determining a calibration correction in accordance with the identified polarization value set.

2. The method of claim 1, wherein the antenna system further comprises a plurality of radiators, the plurality of radiators having either a right-hand circular polarization or a left-hand circular polarization.

3. The method of claim 1, wherein generating a plurality of polarization ratios from the plurality of polarization value sets further comprises:
   selecting a polarization value set of the plurality of polarization value sets;
   obtaining a channel error estimate for the selected polarization value set; and
   establishing a polarization ratio in accordance with the channel error estimate.

4. The method of claim 1, wherein establishing the minimum polarization ratio variance for the plurality of polarization ratios further comprises:
   generating a polarization ratio map over the region; and
   selecting a peak of the polarization ratio map corresponding to the minimum polarization ratio variance.

5. The method of claim 1, wherein establishing the minimum polarization ratio variance for the plurality of polarization ratios further comprises:
   generating a plurality of polarization ratio maps over the region, the plurality of polarization ratio maps comprising an x-form polarization ratio map and a y-form polarization ratio map;
   identifying a plurality of peaks of the plurality of polarization ratio maps; and
   selecting a peak from the plurality of polarization ratio maps, the selected peak corresponding to the minimum polarization ratio variance.

6. The method of claim 1, wherein determining the calibration correlation in accordance with the identified polarization value set further comprises:
   obtaining a channel coefficient from the identified polarization value set; and
   determining the calibration correlation using the channel coefficient.

7. A system for calibrating an antenna, comprising:
   a singly polarized antenna system operable to detect a signal sent from a reference, the reference located within a region, the signal having a polarization within an expected polarization range; and a calibration module coupled to the antenna system and operable to:
  establish a plurality of polarization value sets in accordance with the expected polarization range, a polarization value set comprising one or more polarization values, a polarization value comprising a complex scalar component of a polarization vector;
  generate a plurality of polarization ratios from the plurality of polarization value sets;
  establish a minimum polarization ratio variance for the plurality of polarization ratios, the minimum polarization ratio variance describing a minimum variance of the polarization ratios over the region;
  identify a polarization value set corresponding to the minimum polarization ratio variance; and
  determine a calibration correction in accordance with the identified polarization value set.

8. The system of claim 7, wherein the antenna system further comprises a plurality of radiators, the plurality of radiators having either a right-hand circular polarization or a left-hand circular polarization.

9. The system of claim 7, wherein the calibration module is further operable to generate a plurality of polarization ratios from the plurality of polarization value sets by:
  selecting a polarization value set of the plurality of polarization value sets;
  obtaining a channel error estimate for the selected polarization value set; and
  establishing a polarization ratio in accordance with the channel error estimate.

10. The system of claim 7, wherein the calibration module is further operable to establish the minimum polarization ratio variance for the plurality of polarization ratios by:
  generating a polarization ratio map over the region; and
  selecting a peak of the polarization ratio map corresponding to the minimum polarization ratio variance.

11. The system of claim 7, wherein the calibration module is further operable to establish the minimum polarization ratio variance for the plurality of polarization ratios by:
  generating a plurality of polarization ratio maps over the region, the plurality of polarization ratio maps comprising an x-form polarization ratio map and a y-form polarization ratio map;
  identifying a plurality of peaks of the plurality of polarization ratio maps; and
  selecting a peak from the plurality of polarization ratio maps, the selected peak corresponding to the minimum polarization ratio variance.

12. The system of claim 7, wherein the calibration module is further operable to determine the calibration correlation in accordance with the identified polarization value set by:
  obtaining a channel coefficient from the identified polarization value set; and
  determining the calibration correlation using the channel coefficient.

13. Logic for calibrating an antenna, the logic embodied in a computer readable medium and operable to:
  receive a signal sent from a reference, the signal detected by a singly polarized antenna system, the reference located within a region, the signal having a polarization within an expected polarization range;
  establish a plurality of polarization value sets in accordance with the expected polarization range, a polarization value set comprising one or more polarization values, a polarization value comprising a complex scalar component of a polarization vector;
  generate a plurality of polarization ratios from the plurality of polarization value sets;
  establish a minimum polarization ratio variance for the plurality of polarization ratios, the minimum polarization ratio variance describing a minimum variance of the polarization ratios over the region;
  identify a polarization value set corresponding to the minimum polarization ratio variance; and
  determine a calibration correction in accordance with the identified polarization value set.

14. The logic of claim 13, wherein the antenna system further comprises a plurality of radiators, the plurality of radiators having either a right-hand circular polarization or a left-hand circular polarization.

15. The logic of claim 13, further operable to generate a plurality of polarization ratios from the plurality of polarization value sets by:
  selecting a polarization value set of the plurality of polarization value sets;
  obtaining a channel error estimate for the selected polarization value set; and
  establishing a polarization ratio in accordance with the channel error estimate.

16. The logic of claim 13, further operable to establish the minimum polarization ratio variance for the plurality of polarization ratios by:
  generating a polarization ratio map over the region; and
  selecting a peak of the polarization ratio map corresponding to the minimum polarization ratio variance.

17. The logic of claim 13, further operable to establish the minimum polarization ratio variance for the plurality of polarization ratios by:
  generating a plurality of polarization ratio maps over the region, the plurality of polarization ratio maps comprising an x-form polarization ratio map and a y-form polarization ratio map;
  identifying a plurality of peaks of the plurality of polarization ratio maps; and
  selecting a peak from the plurality of polarization ratio maps, the selected peak corresponding to the minimum polarization ratio variance.

18. The logic of claim 13, further operable to determine the calibration correlation in accordance with the identified polarization value set by:
  obtaining a channel coefficient from the identified polarization value set; and
  determining the calibration correlation using the channel coefficient.

19. A system for calibrating an antenna, comprising:
  means for receiving a signal sent from a reference, the signal detected by a singly polarized antenna system, the reference located within a region, the signal having a polarization within an expected polarization range;
  means for establishing a plurality of polarization value sets in accordance with the expected polarization range, a polarization value set comprising one or more polarization values, a polarization value comprising a complex scalar component of a polarization vector;
  means for generating a plurality of polarization ratios from the plurality of polarization value sets;
  means for establishing a minimum polarization ratio variance for the plurality of polarization ratios, the minimum polarization ratio variance describing a minimum variance of the polarization ratios over the region;
  means for identifying a polarization value set corresponding to the minimum polarization ratio variance; and means for determining a calibration correction in accordance with the identified polarization value set.

20. A method for calibrating an antenna, comprising:

receiving a signal sent from a reference, the signal detected by a singly polarized antenna system, the reference located within a region, the signal having a polarization within an expected polarization range, the antenna system comprising a plurality of radiators, the plurality of radiators having either a right-hand circular polarization or a left-hand circular polarization;

establishing a plurality of polarization value sets in accordance with the expected polarization range, a polarization value set comprising one or more polarization values, a polarization value comprising a complex scalar component of a polarization vector;

generating a plurality of polarization ratios from the plurality of polarization value sets by:
 selecting a polarization value set of the plurality of polarization value sets;
 obtaining a channel error estimate for the selected polarization value set; and
 establishing a polarization ratio in accordance with the channel error estimate;

establishing a minimum polarization ratio variance for the plurality of polarization ratios, the minimum polarization ratio variance describing a minimum variance of the polarization ratios over the region, the minimum polarization ratio variance for the plurality of polarization ratios established by:
 generating a plurality of polarization ratio maps over the region, the plurality of polarization ratio maps comprising an x-form polarization ratio map and a y-form polarization ratio map;
 identifying a plurality of peaks of the plurality of polarization ratio maps; and
 selecting a peak from the plurality of polarization ratio maps, the selected peak corresponding to the minimum polarization ratio variance; and determining a calibration correction in accordance with the identified polarization value set by:
 obtaining a channel coefficient from the identified polarization value set; and
 determining the calibration correlation using the channel coefficient.

* * * * *

UNITED STATES PATENT AND TRADEMARK OFFICE
CERTIFICATE OF CORRECTION

PATENT NO. : 7,015,857 B1  
APPLICATION NO. : 10/970255  
DATED : March 21, 2006  
INVENTOR(S) : Jerome H. Pozgay Page 1 of 1

It is certified that error appears in the above-identified patent and that said Letters Patent is hereby corrected as shown below:

Column 3, Line 19:
Delete " $\mathbf{x} = x\hat{\mathbf{x}} + y\hat{\mathbf{y}}°z\hat{\mathbf{z}}$ " and insert -- $\mathbf{x} = x\hat{\mathbf{x}} + y\hat{\mathbf{y}} + z\hat{\mathbf{z}}$ --.

Column 6, Line 28:
Delete " $0\varsigma^{mt} \cdot \Re(u_{zero}, v_{zero})$ " and insert -- $0 \approx \varsigma^{mt} \cdot \Re(u_{zero}, v_{zero})$ --.

Column 6, Line 36:
Delete " $0 \approx \varsigma^{mt}[p_x \cdot \Re_x(u_{zero}, v_{zero}) + p_y \cdot \Re_y(u_{zero}, v_{zero})]$ " and insert -- $0 \approx \varsigma^{mt}[p_x \cdot \Re_x(u_{zero}, v_{zero}) + p_y \cdot \Re_y(u_{zero}, v_{zero})]$ --.

Signed and Sealed this

Twenty-fourth Day of June, 2008

JON W. DUDAS  
*Director of the United States Patent and Trademark Office*